(12) United States Patent  
Byun

(10) Patent No.: US 8,440,336 B2  
(45) Date of Patent: May 14, 2013

(54) RECHARGEABLE BATTERY WITH SHORT CIRCUIT MEMBER

(75) Inventor: Sang-Won Byun, Suwon-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 342 days.

(21) Appl. No.: 12/789,114

(22) Filed: May 27, 2010

(65) Prior Publication Data

US 2011/0135976 A1 Jun. 9, 2011

Related U.S. Application Data

(60) Provisional application No. 61/267,790, filed on Dec. 8, 2009.

(51) Int. Cl.
*H01M 10/52* (2006.01)

(52) U.S. Cl.
USPC .................. 429/59; 429/56; 429/58

(58) Field of Classification Search ............. 429/56, 429/58, 59
See application file for complete search history.

(56) References Cited

U.S. PATENT DOCUMENTS

| | | | |
|---|---|---|---|
| 5,523,178 A * | 6/1996 | Murakami et al. | 429/53 |
| 6,342,826 B1 | 1/2002 | Quinn et al. | |
| 2008/0145748 A1* | 6/2008 | Jung | 429/56 |
| 2011/0039136 A1* | 2/2011 | Byun et al. | 429/56 |

FOREIGN PATENT DOCUMENTS

| | | |
|---|---|---|
| EP | 1 717 886 A2 | 11/2006 |
| JP | 05-062664 | 3/1993 |
| JP | 2006-147180 | 6/2006 |
| KR | 10-2001-0021236 A | 3/2001 |
| KR | 10-2006-0020211 | 3/2006 |

OTHER PUBLICATIONS

Korean Office Action, dated Mar. 19, 2012, corresponding to 10-2010-0062270, 5 pages.
European Search Report dated Feb. 8, 2011, for corresponding European Patent application 10168526.1, 4 pages.
European Search Report dated Aug. 16, 2010, for corresponding European Patent application 101685263.1, noting listed references in this IDS.

* cited by examiner

*Primary Examiner* — Zachary Best
(74) *Attorney, Agent, or Firm* — Christie, Parker & Hale, LLP

(57) ABSTRACT

A rechargeable battery includes: an electrode assembly including a first electrode, a second electrode, and a separator between the first electrode and the second electrode; a case containing the electrode assembly; and a cap assembly coupled to the case. The cap assembly includes a cap plate and a short circuit member attached to the cap plate. The short circuit member includes a portion having a different thickness from another portion of the short circuit member.

15 Claims, 5 Drawing Sheets

RECHARGEABLE BATTERY WITH SHORT CIRCUIT MEMBER

CROSS-REFERENCE TO RELATED APPLICATIONS

This application claims priority to and the benefit of U.S. Provisional Application No. 61/267,790, filed on Dec. 8, 2009, in the United States Patent and Trademark Office, the disclosure of which is incorporated herein in its entirety by reference.

BACKGROUND

1. Field

Embodiments of the present invention relate to a rechargeable battery.

2. Description of the Related Art

A rechargeable battery can be repeatedly charged and discharged, unlike a primary battery, which is not designed to be recharged. A small capacity rechargeable battery is used for a small portable electronic device, such as a mobile phone, a laptop computer, or a camcorder. A large capacity rechargeable battery is used as a power source for driving a motor, such as for a hybrid electric vehicle.

A high power rechargeable battery using a high energy density non-aqueous electrolyte has been developed, and such a high power rechargeable battery is formed by coupling a plurality of unit cells in series in order to drive a motor of a machine or equipment, for example an electric vehicle that requires a large amount of electric power.

A unit cell of the rechargeable battery is formed with a cylindrical shape or a rectangular shape. A rectangular rechargeable battery includes an electrode assembly in which a positive electrode and a negative electrode are positioned with a separator located therebetween, a case that houses the electrode assembly, and a cap plate that closes and seals the case and that has a terminal hole. A terminal is inserted into the terminal hole, is electrically connected to the electrode assembly, and protrudes to the outside of the case.

If excessive heat occurs at the inside thereof due to charge and discharge operations, or if an internal pressure rises due to decomposition of an electrolyte solution, such a rechargeable battery may explode or ignite. It is difficult for a rectangular rechargeable battery to have a structure for interrupting or discharging a current upon overcharge due to particularity of its terminal structure, compared with a cylindrical battery.

The above information disclosed in this Background section is only for enhancement of understanding of the background of the embodiments disclosed herein and therefore it may contain information that does not form the prior art that is already known in this country to a person of ordinary skill in the art.

SUMMARY

Exemplary embodiments according to the present invention provide a rechargeable battery that is capable of relieving the rising internal pressure, and sustaining a such relieved state.

Exemplary embodiments according to the present invention provide a rechargeable battery that is capable of short-circuiting a positive electrode and a negative electrode to each other when the internal pressure rises, and sustaining a such short circuit state.

According to an exemplary embodiment of the present invention, a rechargeable battery includes: an electrode assembly including a positive electrode, a negative electrode, and a separator; a case that houses the electrode assembly; a cap assembly that is coupled to an opening of the case; and a short circuit tab and short circuit member that are provided in the cap assembly. The short circuit member is configured to be deformed when an internal pressure of the case rises and thus to electrically short-circuit the positive electrode and the negative electrode to each other. The short circuit member has a protruded portion for contacting the short circuit tab when the short circuit member is deformed.

According to an exemplary embodiment of the present invention, when an internal pressure of a rechargeable battery rises, a short circuit member contacts a short circuit tab to short-circuit a negative electrode and a positive electrode to each other, and thus a large current flows between the positive electrode and the negative electrode, whereby an electrode assembly of the battery is discharged. Thereby, the internal pressure is prevented from rising further. In one embodiment, the protruded portion of the short circuit member is not melted and sustains a contact state with the short circuit tab. This way, the electrode assembly no longer performs charge and discharge operations.

In an exemplary embodiment according to the present invention, a rechargeable battery includes: an electrode assembly including a first electrode, a second electrode, and a separator between the first electrode and the second electrode; a case containing the electrode assembly; and a cap assembly coupled to the case. The cap assembly includes a cap plate and a short circuit member attached to the cap plate. The short circuit member includes a portion having a different thickness from another portion of the short circuit member.

The short circuit member may be configured to deform in response to an increase in pressure inside the case to electrically couple the first electrode and the second electrode to each other.

The short circuit member may include a protruded portion at a central region of the short circuit member that is thicker than at least one other portion of the short circuit member. The thickness of the short circuit member may gradually increase from its peripheral region toward its central region.

The short circuit member may be electrically coupled to the cap plate. The cap assembly may further include a short circuit tab located outside of the case and on the cap plate and electrically coupled to the first electrode. The short circuit member may be configured to deform in response to an increase in pressure inside the case to contact the short circuit tab. The short circuit member may be configured for its thicker portion to contact the short circuit tab when deformed.

The cap assembly may further include an insulation member between the short circuit tab and the cap plate for electrically insulating the short circuit tab from the cap plate.

The cap assembly may further include a first terminal electrically coupled to the first electrode and mounted on the cap plate, and a gasket electrically insulating the first terminal from the cap plate, wherein the short circuit tab has an opening through which the first terminal protrudes from interior to exterior of the case. The short circuit tab may be fixed to the cap plate by a nut coupled to the first terminal.

The second electrode may be electrically coupled to the cap plate. The cap assembly may further include a second terminal electrically coupling the second electrode to the cap plate. The cap assembly may further include a connection plate electrically coupling the second terminal to the cap plate.

The short circuit member may be curved to protrude toward inside of the case.

The cap assembly may have a vent opening, and may further include a vent plate mounted on the cap plate to cover the vent opening. The vent plate may have a notch configured to be opened in response to a further increase in pressure inside the case.

Figure 1:
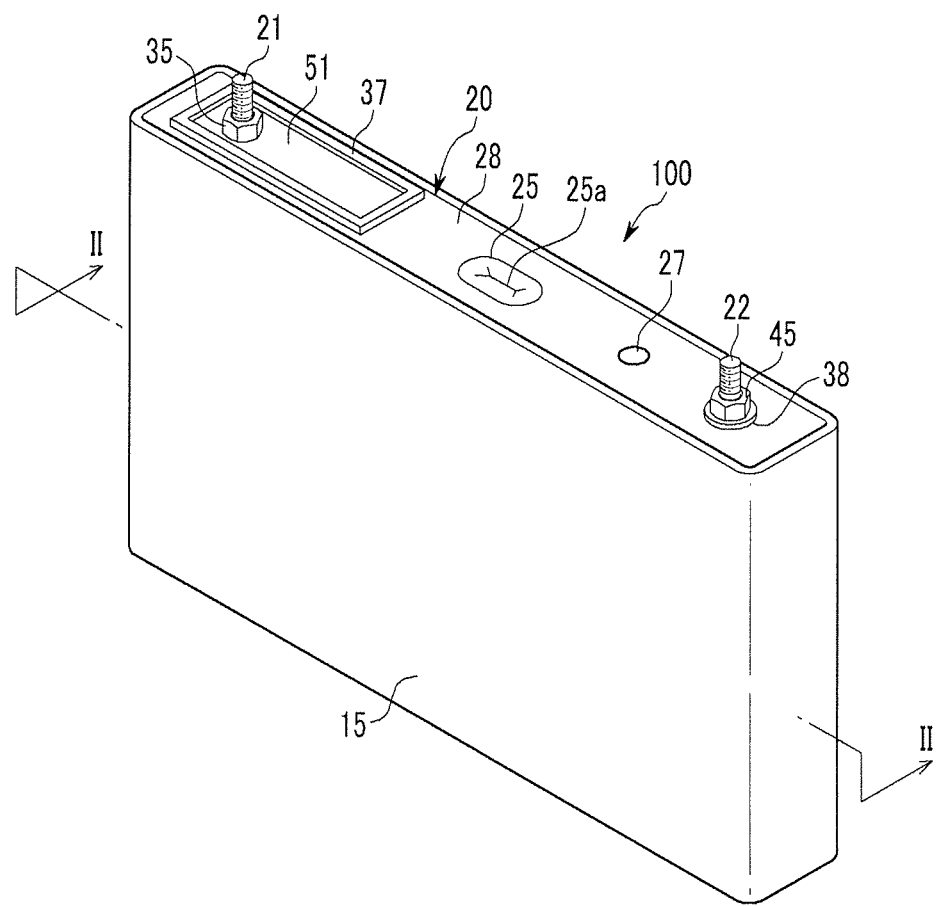
FIG. 1 is a perspective view illustrating a rechargeable battery according to an exemplary embodiment of the present invention.

DESCRIPTION OF REFERENCE NUMERALS INDICATING SOME OF THE ELEMENTS IN THE DRAWINGS

| | |
|---|---|
| 100, 200: | rechargeable battery |
| 10: | electrode assembly |
| 11: | positive electrode (e.g., second electrode) |
| 11a, 12a: | uncoated region |
| 12: | negative electrode (e.g., first electrode) |
| 13: | separator |
| 15: | case |
| 20: | cap assembly |
| 21, 22: | first terminal and second terminal |
| 21a, 22a: | flange |
| 21b, 22b: | screw portion (or threaded portion) |
| 23: | short circuit hole (or opening) |
| 24: | vent hole (e.g., vent opening) |
| 25: | vent plate |
| 25a: | notch |
| 27: | seal stopper |
| 28: | cap plate |
| 29: | electrolyte injection opening |
| 31, 32: | negative electrode lead tab, positive electrode lead tab |
| 31b: | terminal bonding portion |
| 31c: | electrode assembly bonding portion |
| 31d: | terminal hole |
| 35, 45: | nut |
| 36, 39: | gasket |
| 37: | insulation member |
| 41, 42: | lower insulation member |
| 51: | short circuit tab |
| 53, 63: | short circuit member |
| 531, 631: | curved portion |
| 532, 632: | circumferential edge portion |
| 533, 633: | protruded portion |

DETAILED DESCRIPTION

Aspects of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and the drawings.

In exemplary embodiments according to the present invention, a rechargeable battery short-circuits a positive electrode and a negative electrode to each other when an internal pressure of the battery rises above a threshold value, and sustains such short circuit state. The rechargeable battery includes: an electrode assembly including a positive electrode, a negative electrode, and a separator; a case that houses the electrode assembly; a cap assembly that is coupled to an opening of the case; and a short circuit tab and short circuit member that are provided in the cap assembly. The short circuit member is deformed when the internal pressure of the case rises to electrically short-circuit the positive electrode and the negative electrode to each other. The short circuit member has a portion having a different thickness from another portion of the short circuit member. The portion having a different thickness may be a protruded portion located at a portion contacting the short circuit tab, or the short circuit member may have a thickness that gradually changes from its peripheral region to its center region to be the thickest at the center portion for contacting the short circuit tab when the short circuit member is deformed.

Figure 2:
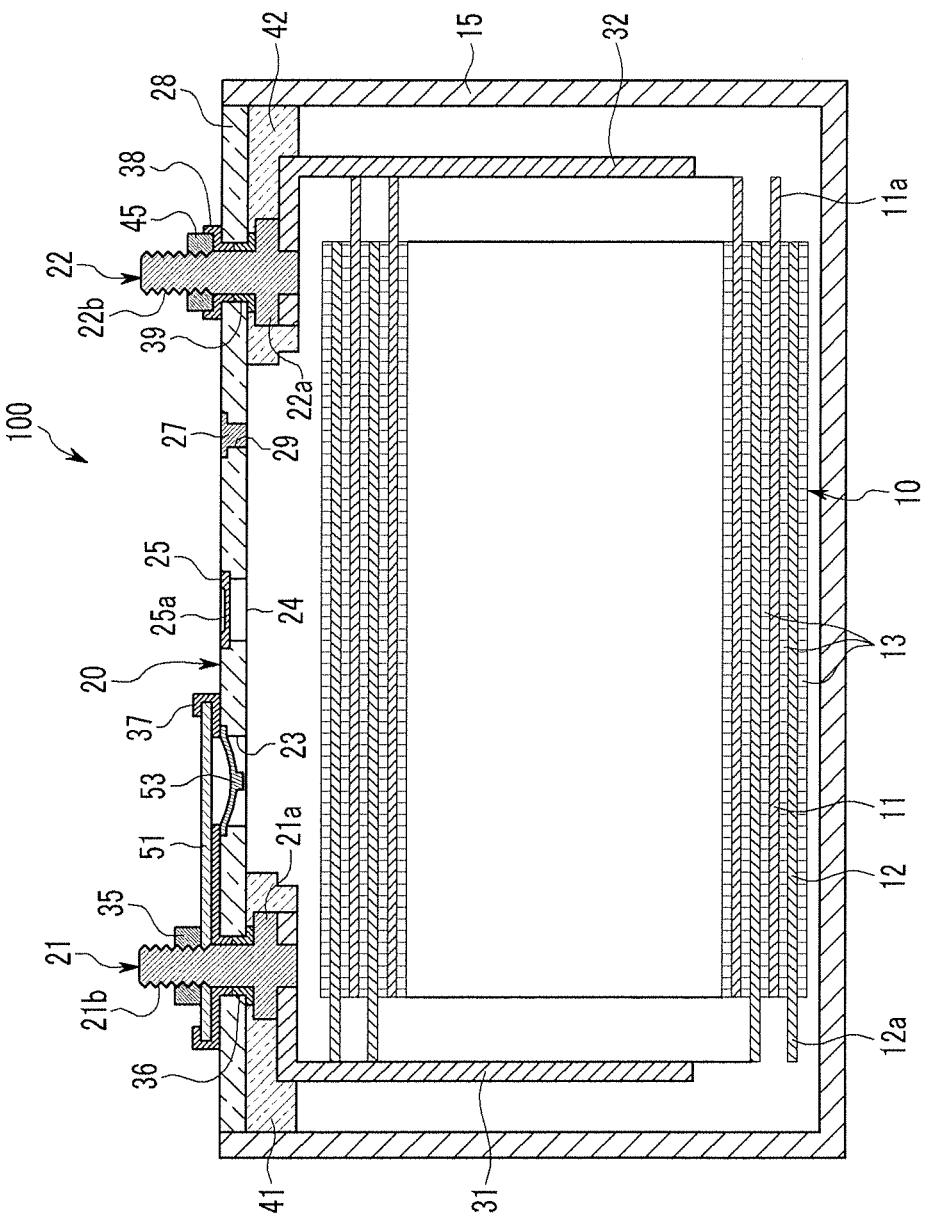
FIG. 2 is a cross-sectional view illustrating a rechargeable battery taken along the line II-II of FIG. 1.

FIG. 1 is a perspective view illustrating a rechargeable battery according to an exemplary embodiment of the present invention, and FIG. 2 is a cross-sectional view illustrating a rechargeable battery taken along the line II-II of FIG. 1. Referring to FIGS. 1 and 2, a rechargeable battery 100 according to an exemplary embodiment includes an electrode assembly 10, a case 15 that houses the electrode assembly 10, and a cap assembly 20 that is coupled to an opening of the case 15.

The electrode assembly 10 is formed by spiral-winding a positive electrode 11 and a negative electrode 12, and a separator 13 together. The separator 13 is an insulator that is interposed between the positive electrode 11 and the negative electrode 12. Alternatively, the electrode assembly may be formed by stacking a plurality of positive electrodes, a plurality of separators, and a plurality of negative electrodes that are formed as plates or sheets. The negative electrode 12 may be referred to as a first electrode and the positive electrode 11 may be referred to as a second electrode throughout the specification, but are not limited thereto.

Each of the positive electrode 11 and the negative electrode 12 includes a thin plate that operates as a current collector. The thin plate has a coating region on which an active material is coated and an uncoated region on which an active material is not coated. The positive electrode 11 has an uncoated region 11a, and the negative electrode 12 has an uncoated region 12a. The uncoated region 11a of the positive electrode 11 is formed at one end of the positive electrode 11 along a lengthwise direction of the positive electrode 11, and the uncoated region 12a of the negative electrode 12 is formed at the other end of the negative electrode 12 along a lengthwise direction of the negative electrode 12. As such, as can be seen in FIG. 2, the uncoated regions 11a and 12a are located on opposite sides of the electrode assembly 10 in a direction that is parallel to a cap plate 28 of the cap assembly 20.

The case 15 is formed to have a generally cuboid shape to form a space (or cavity) that houses the electrode assembly 10 at the inside thereof, and has an opening at one side to gain access to (or in communication with) the internal space.

The cap assembly 20 includes the cap plate 28 that covers the opening of the case 15, and a first terminal 21 and a second terminal 22 that protrude from inside to the outside of the case 15 through the cap plate 28.

The cap plate 28 is formed with a thin plate and is coupled to the opening of the case 15. In other words, the cap plate 28 substantially covers the opening of the case 15. The cap plate 28 has an electrolyte injection opening 29 and a vent hole (or vent opening) 24. A seal stopper 27 is installed at the electrolyte injection opening 29, and a vent plate 25 is installed at the vent hole 24. The vent plate 25 has a notch 25a that is designed to open (or be breached) when an internal pressure of the rechargeable battery 100 arrives at a preset pressure, which may be higher than a threshold pressure for deforming a short circuit member 53.

The first terminal 21 and the second terminal 22 are electrically connected to the electrode assembly 10, and installed to penetrate (or protrude) through the cap plate 28, such that the electrode assembly 10 can be electrically connected to components outside of the case 15. That is, the first terminal 21 is electrically connected to the negative electrode 12 of the electrode assembly 10, and the second terminal 22 is electrically connected to the positive electrode 11.

The first terminal 21 and the second terminal 22 respectively have flanges 21a and 22a at the inside of the case 15 and screw portions (e.g., threaded portions) 21b and 22b at the outside of the case 15. By fastening nuts 35 and 45 respectively to the screw portions 21b and 22b, the nuts 35 and 45 support a first side (e.g., the outside) of the cap plate 28 from the outside of the case 15, and the flanges 21a and 22a support a second side (e.g., the inside) of the cap plate 28 at the inside of the case 15. This way, the first and second terminals 21 and 22 are fixed to the cap plate 28.

Gaskets 36 and 39 are respectively installed between the first and second terminals 21 and 22 and the cap plate 28 to seal a space between the first and second terminals 21 and 22 and the cap plate 28, respectively.

The first terminal 21 is electrically connected to the negative electrode 12 by a negative electrode lead tab 31, and the second terminal 22 is electrically connected to the positive electrode 11 by a positive electrode lead tab 32. The negative electrode lead tab 31 and the positive electrode lead tab 32 have substantially the same structure as each other, and thus a description regarding the negative electrode lead tab 31 is also applicable to the positive electrode lead tab 32.

Figure 3:
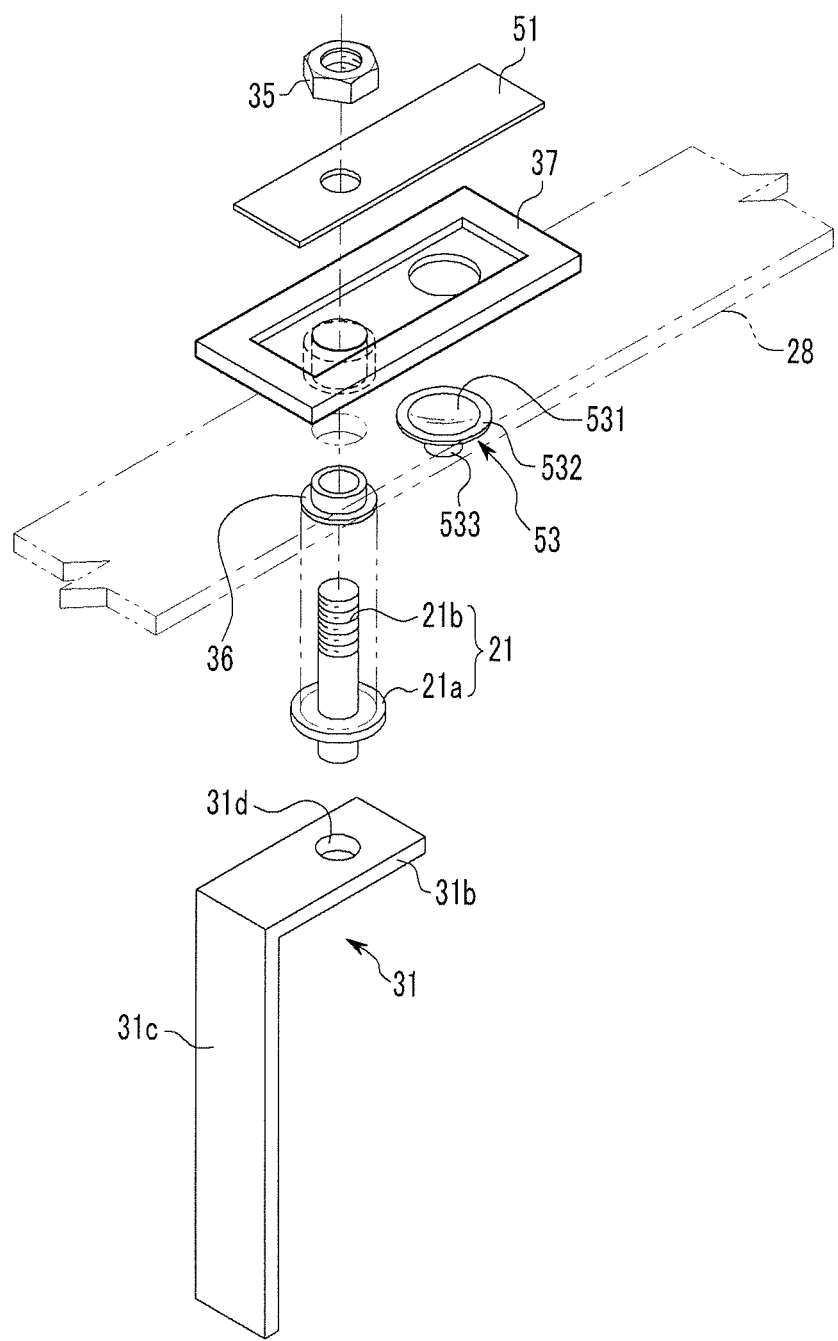
FIG. 3 is an exploded perspective view of the first terminal side in the rechargeable battery of FIG. 1.

FIG. 3 is an exploded perspective view of the first terminal side in the rechargeable battery of FIG. 1. Referring to FIG. 3, the negative electrode lead tab 31 includes a terminal bonding portion 31b and an electrode assembly bonding portion 31c that are orthogonally bent with respect to each other. In other words, the negative electrode lead tab 31 is bent at a right angle to have the terminal bonding portion 31b and the electrode assembly bonding portion 31c that are perpendicular to each other.

The terminal bonding portion 31b has a terminal hole (or terminal opening) 31d through which the first terminal 21 is inserted. When the first terminal 21 is inserted through the terminal hole 31d, the flange 21a contacts an area (e.g., a wide area) of the terminal bonding portion 31b. The electrode assembly bonding portion 31c is attached to the negative electrode 12 by welding to the negative uncoated region 12a. Thereby, the first terminal 21 is electrically connected to the negative electrode 12 of the electrode assembly 10.

Referring again to FIG. 2, lower insulation members 41 and 42 are respectively located between the negative and positive electrode lead tabs 31 and 32 and the cap plate 28, and cover a side surface of the negative and positive electrode lead tabs 31 and 32 to electrically insulate the negative and positive electrode lead tabs 31 and 32 from the cap plate 28. Further, the lower insulation members 41 and 42 are located between the cap plate 28 and the flanges 21a and 22a of the first and second terminals 21 and 22 that are positioned at a surface of the negative and positive electrode lead tabs 31 and 32, respectively, to electrically insulate the flanges 21a and 22a from the cap plate 28.

The rechargeable battery 100 according to an exemplary embodiment has a short circuit tab 51 and a short circuit member 53 located on the cap plate 28 between the first and second terminals 21 and 22 in order to short-circuit the positive electrode 11 and the negative electrode 12 when the internal pressure rises. For the sake of convenience, the exemplary embodiment will be described primarily in reference to the rechargeable battery 100 having the short circuit tab 51 and the short circuit member 53 at the first terminal 21 side. In other words, the short circuit tab 51 and the short circuit member 53 are located closer to the first terminal 21 than to the second terminal 22 in the primarily described embodiment. However, the present invention is not limited thereto.

At the first terminal 21 side, the short circuit tab 51 is electrically connected to the first terminal 21 and is located on the cap plate 28 at the outside of the case 15. An insulation member 37 is located between the short circuit tab 51 and the cap plate 28 to electrically insulate the short circuit tab 51 from the cap plate 28. Further, the insulation member 37 is formed to have a structure that encloses the side of the short circuit tab 51 to improve insulation safety. In other words, the insulation member 37 surrounds the peripheral edges of the short circuit tab 51 to better electrically insulate the short circuit tab 51 from the cap plate 28. The first terminal 21 is inserted through the short circuit tab 51 and is electrically connected to the short circuit tab 51. By fastening the nut 35 to the screw portion (e.g., the threaded portion) 21b of the first terminal 21, the short circuit tab 51 and the insulation member 37 are fixed to the cap plate 28 at the first terminal 21 side.

At the second terminal 22 side, a connection plate 38 electrically connects the second terminal 22 and the cap plate 28 to each other. The second terminal 22 is inserted through the connection plate 38. By fastening the nut 45 to the screw portion 22b of the second terminal 22, the connection plate 38 closely contacts the cap plate 28.

When internal pressure of the rechargeable battery 100 rises (e.g., to reach a threshold value), the short circuit member 53 is deformed (e.g., curved upward in a direction away from the internal space of the case 15) to contact the short circuit tab 51 and thus to short-circuit the short circuit tab 51 and the cap plate 28 to each other, such that a short-circuited state is sustained.

Figure 4:
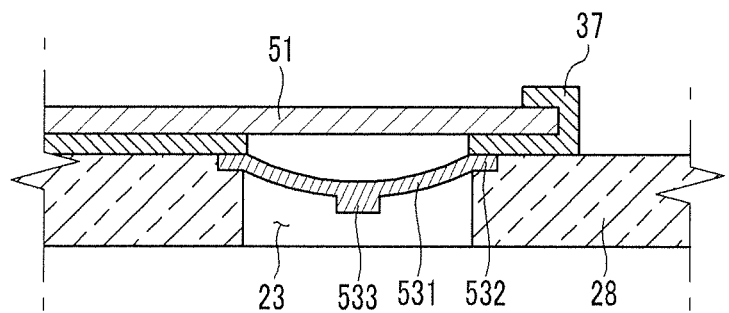
FIG. 4 is a cross-sectional view illustrating a separation state of a short circuit tab and a short circuit member during the normal operation of the rechargeable battery of FIG. 1.

FIG. 4 is a cross-sectional view illustrating a separation state of a short circuit tab and a short circuit member during a normal operation of the rechargeable battery of FIG. 1. Referring to FIG. 3 and FIG. 4, in order to install the short circuit member 53, the cap plate 28 has a short circuit hole 23.

The short circuit member 53 is located between the insulation member 37 and the cap plate 28 at the short circuit hole 23. The short circuit member 53 has a thin film of a curved portion 531 that is formed in an arc shape to be convex inwardly toward the internal space of the case 15, a circumferential edge portion 532 (or a peripheral region) that is formed at the outer side of the curved portion 531 to be electrically connected and fixed to the cap plate 28, and a protruded portion 533 that is protruded to the inside of the case 15 from the center of the curved portion 531. For example, when the curved portion 531 is formed to have a thickness of 0.4 mm, the protruded portion 533 may be formed to have a thickness of 0.5 to 0.6 mm. The short circuit member 53 is configured so that the concavity of the curved portion 531 can be reversed (see FIG. 5) when the internal pressure of the case 15 rises.

Figure 5:
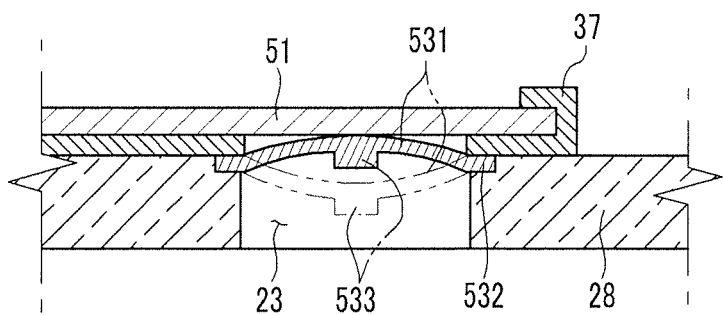
FIG. 5 is a cross-sectional view illustrating a contact state of a short circuit tab and a short circuit member when an internal pressure of the rechargeable battery of FIG. 1 rises.

FIG. 5 is a cross-sectional view illustrating a contact state of a short circuit tab and a short circuit member when an internal pressure of the rechargeable battery of FIG. 1 rises. Referring to FIG. 5, the short circuit tab 51 is extended from the first terminal 21 to cover the short circuit hole 23. Therefore, the short circuit member 53 is reversed by the increase of the internal pressure of the case 15 to protrude to the outer surface of the cap plate 28 through the short circuit hole 23. In this case, as the short circuit member 53 contacts the short circuit tab 51, the short circuit tab 51 and the cap plate 28 are electrically connected (see FIG. 5). Thereby, the negative electrode 12 and the positive electrode 11 are short-circuited to each other.

When a short circuit occurs, as a large current instantaneously (or substantially instantaneously) flows between the positive electrode 11 and the negative electrode 12, the electrode assembly 10 is discharged.

Further, as the protruded portion 533 contacts the short circuit tab 51, when a short circuit occurs, in spite of high heat that is generated between the center of the curved portion 531 and the short circuit tab 51, the protruded portion 533 is not melted and sustains a contact state. That is, as the protruded portion 533 contacts the short circuit tab 51, the protruded portion 533 may be partially melted by heat that is generated when a large current instantaneously flows, but the protruded portion 533 continues to sustain a contact state with the short circuit tab 51. Therefore, the negative electrode 12 and the positive electrode 11 continue to sustain a short circuit state. The electrode assembly 10 then no longer performs charge and discharge operations.

When a short circuit state between the negative electrode 12 and the positive electrode 11 is not sustained and an internal temperature and pressure rise, the rechargeable battery 100 may repeat charge and discharge and may thus explode or ignite. In embodiments according to the present invention, the protruded portion 533 of the short circuit member 53 can prevent explosion or ignition of the rechargeable battery 100 by sustaining the short circuit state between the positive and negative electrodes 11 and 12.

Hereinafter, another exemplary embodiment will be described, but a detailed description of constituent elements identical to or corresponding to those of the previously described exemplary embodiment will be omitted, and only dissimilar constituent elements will be described in detail.

Figure 6:
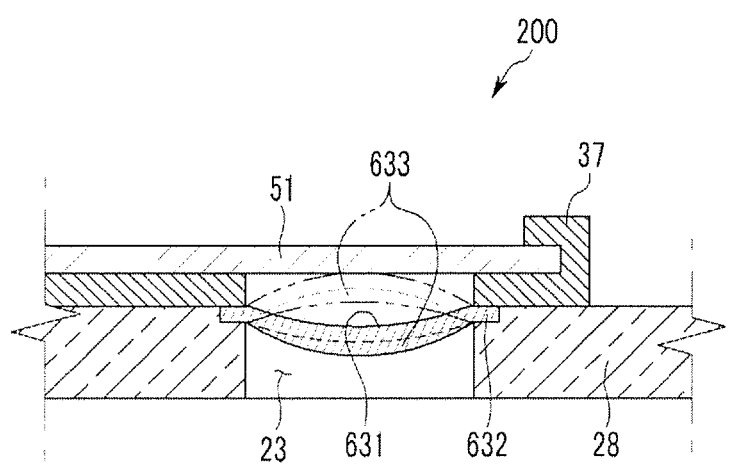
FIG. 6 is a cross-sectional view illustrating a separation state and a contact state of a short circuit tab and a short circuit member in a rechargeable battery according to another exemplary embodiment of the present invention.

FIG. 6 is a cross-sectional view illustrating an operation state of a short circuit tab and a short circuit member in a rechargeable battery according to another exemplary embodiment of the present invention. Referring to FIG. 6, in a rechargeable battery 200 according to another exemplary embodiment, a protruded portion 633 of a short circuit member 63 is formed in a structure having a gradually increasing thickness toward the center of a curved portion 631 from a circumferential edge portion 632 (solid line state).

When temperature and pressure of the inside of the rechargeable battery 200 rise, the curved portion 631 of the short circuit member 63 is reversed to contact the short circuit tab 51, and the short circuit tab 51 and the cap plate 28 are electrically connected to each other (phantom line state). In this case, as the protruded portion 633 contacts the short circuit tab 51, when a short circuit occurs, in spite of high heat generated between the center of the curved portion 631 and the short circuit tab 51, the protruded portion 633 is not melted and sustains a contact state.

While aspects of this invention have been described in connection with certain exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
   an electrode assembly comprising a first electrode, a second electrode, and a separator between the first electrode and the second electrode;
   a case containing the electrode assembly; and
   a cap assembly coupled to the case, the cap assembly comprising a cap plate, a deformable short circuit member, and a short circuit tab, the deformable short circuit member being attached to the cap plate, the short circuit tab being located outside of the case and on the cap plate and being electrically coupled to the first electrode,
   wherein the thickness of the short circuit member is greater at its central region than at its peripheral region.

2. The rechargeable battery of claim 1, wherein the deformable short circuit member is configured to deform in response to an increase in pressure inside the case to electrically couple the first electrode and the second electrode to each other.

3. The rechargeable battery of claim 1, wherein the deformable short circuit member comprises a protruded portion at its central region that is thicker than at least one other portion of the short circuit member.

4. The rechargeable battery of claim 1, wherein the thickness of the deformable short circuit member gradually increases from its peripheral region toward its central region.

5. The rechargeable battery of claim 1, wherein the deformable short circuit member is configured to deform in response to an increase in pressure inside the case to contact the short circuit tab.

6. The rechargeable battery of claim 5, wherein the deformable short circuit member is configured for its thicker portion to contact the short circuit tab when deformed.

7. The rechargeable battery of claim 1, wherein the cap assembly further comprises an insulation member between the short circuit tab and the cap plate for electrically insulating the short circuit tab from the cap plate.

8. The rechargeable battery of claim 1, wherein the cap assembly further comprises a first terminal electrically coupled to the first electrode and mounted on the cap plate, and a gasket electrically insulating the first terminal from the cap plate, wherein the short circuit tab has an opening through which the first terminal protrudes from interior to exterior of the case.

9. The rechargeable battery of claim 8, wherein the short circuit tab is fixed to the cap plate by a nut coupled to the first terminal.

10. The rechargeable battery of claim 1, wherein the second electrode is electrically coupled to the cap plate.

11. The rechargeable battery of claim 10, wherein the cap assembly further comprises a second terminal electrically coupling the second electrode to the cap plate.

12. The rechargeable battery of claim 11, wherein the cap assembly further comprises a connection plate electrically coupling the second terminal to the cap plate.

13. The rechargeable battery of claim 1, wherein the deformable short circuit member is curved to protrude toward inside of the case.

14. The rechargeable battery of claim 1, wherein the cap assembly has a vent opening, and further comprises a vent plate mounted on the cap plate to cover the vent opening.

15. The rechargeable battery of claim 14, wherein the vent plate has a notch configured to be opened in response to a further increase in pressure inside the case.

\* \* \* \* \*